United States Patent [19]

Bean et al.

[11] Patent Number: 5,558,772
[45] Date of Patent: Sep. 24, 1996

[54] STABLE NITRITE SOLUTIONS

[75] Inventors: Samuel L. Bean, Wilmington, Del.; Walter H. Bortle, Jr., Chester, Pa.

[73] Assignee: General Chemical Corporation, Parsippany, N.J.

[21] Appl. No.: 397,963

[22] Filed: Mar. 3, 1995

[51] Int. Cl.$^6$ ...................................................... C02F 1/50
[52] U.S. Cl. ........................... 210/764; 210/757; 422/14
[58] Field of Search .................................. 210/764, 696, 210/757; 422/14

[56] References Cited

U.S. PATENT DOCUMENTS 4,537,682  8/1985  Wong-Chong .......................... 210/611
4,917,805  4/1990  Reid ...................................... 210/630
5,266,200  11/1993 Reid ...................................... 210/605
5,465,588  11/1995 Mornhed et al. ........................... 62/59

*Primary Examiner*—Neil McCarthy
*Attorney, Agent, or Firm*—Arthur J. Plantamura

[57]  ABSTRACT

The action of the bacterium *Nitrobacter agilis* to oxidize nitrite ions to nitrate ions in aqueous solutions is well known. We have found that if the nitrite ion concentration in solution is maintained at a level of at least 2.5 percent by weight and higher, that the activity of this bacterium is completely inhibited and the nitrite salt solutions remain stable over long periods of time.

5 Claims, 1 Drawing Sheet

STABLE NITRITE SOLUTIONS

This invention relates to a method of inhibiting bacteria that oxidize nitrite ions to nitrate ions. More particularly, this invention relates to a nitrite solution unaffected by the *Nitrobacter agilis* bacteria.

BACKGROUND OF THE INVENTION

Dilute aqueous nitrite solutions are known to be effective anticorrosive agents for metals, particularly for iron-based metal parts. It is believed nitrites function by forming a protective oxide film on metal surfaces. Suitable concentrations required for anti-corrosion properties are about 500–1000 ppm of sodium nitrite ($NaNO_2$). At higher concentrations of 2–4 percent by weight, the aqueous solutions also act as an aqueous solution freezing point depressant. However, it is also known that dilute aqueous nitrite solutions are unstable and gradually lose their ability to reduce corrosion. This occurs because of a loss of nitrite after exposure of the solution to the atmosphere. Prior art workers have disclosed that a bacteria known as *Nitrobacter agilis*, which is present in air, propagates in nitrite solution, via a process that oxidizes the nitrite ions to nitrate ions. Nitrate ions have no anticorrosion effects. Thus the nitrite ion becomes depleted and the efficacy of these solutions as anticorrosive agents is lost.

Lundgren et al, U.S. Pat. No. 3,087,777 disclose that a solution containing 500 ppm of nitrite ion initially, after exposure to the *Nitrobacter agilis* bacteria, lost all of its nitrite content in six days.

The bacterial action with nitrite solutions has been corroborated by Conoby et al, "Nitrite as a Corrosion Inhibitor", Materials Protection, April 1967 pp 55–58. The authors tested the use of dilute nitrite solutions for air conditioning systems. As long as the nitrite concentration, originally about 250–300 ppm as $NaNO_2$, was maintained, no corrosion of the equipment was noted. However, rapid nitrite loss was noted in one tank, believed to be due to bacterial action, whereupon the anticorrosive effects of the nitrite solution disappeared.

Thus Lundgren et al suggested a variety of bactericides for this bacteria, which did extend the period of time the nitrite ion concentration remained stable in dilute solution. Further work with various bactericides has also been carried out by many prior art workers to overcome the bacterial action in dilute aqueous nitrite solutions. These bactericides include a variety of organic compounds and metal salts, such as chromates.

However these solutions find their way into ground water or sewage systems and, in accordance with present day environmental requirements, heavy metals and organic materials must first be removed from solutions prior to their disposal into sewage systems and waterways. This adds to the costs of using these solutions, and a ready means of disposal of the various pollutants is not always available. Thus it would be highly desirable if the use of bactericides for nitrite solutions could be avoided, while maintaining the nitrite content at a high enough level so that the anticorrosive properties of these solutions can be maintained.

SUMMARY OF THE INVENTION

We have found that at a minimum concentration of nitrite ion the action of *Nitrobacter agilis* bacteria is inhibited. Such antibacterial nitrite solutions must contain at least about 2.5 percent by weight and preferably 4 percent by weight or higher of nitrite salts, in order to inhibit the propagation of this bacteria.

Thus we have found that anticorrosion solutions containing relatively high amounts of nitrite ions remain relatively stable over time, and maintain their anticorrosive effects, even when they are exposed to the *Nitrobacter agilis* bacteria.

BACKGROUND OF THE INVENTION

Figure 1:
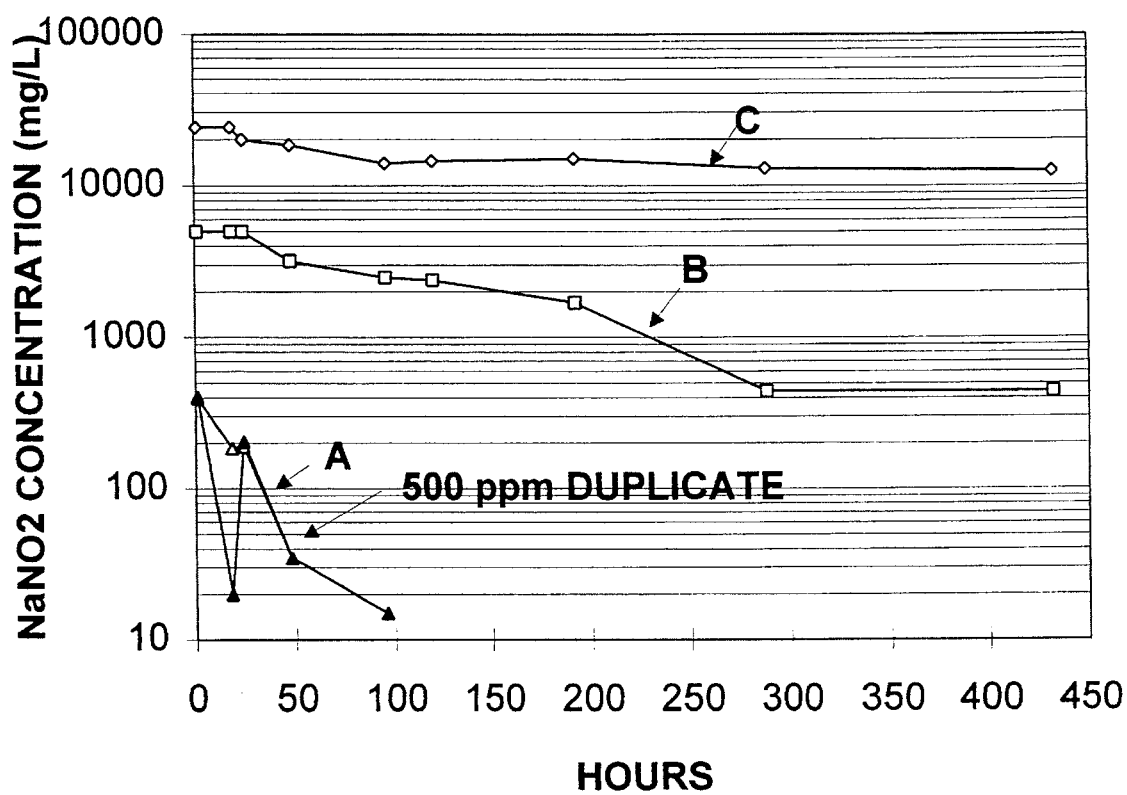
FIG. 1 is a graph of nitrite concentration versus time for 0.05 percent, 0.5 percent and 2.5 percent by weight aqueous solutions of sodium nitrite containing the *Nitrobacter agilis* bacteria.

We have found that if a minimum concentration of nitrite ions in aqueous solution is maintained, the nitrite solution remains relatively stable and inhibits the propagation of the *Nitrobacter agilis* bacteria over long periods of time. Solutions containing about 4 percent by weight or more of nitrite ion, and concomitantly about 2–4 percent by weight of nitrate ion, remain stable for months. Although there is some loss of nitrite ion over time, the evidence is that it is due to chemical oxidation, rather than by action of bacteria, and the anticorrosion properties of the solution can be maintained by re-adjustment of the nitrite ion concentration as required.

The pH of the nitrite aqueous solutions should be at least about pH 8, and can be up to pH 10. The pH can be adjusted with any commonly available base, such as sodium bicarbonate, sodium hydroxide and the like.

The antibacterial effects of the present high nitrite content aqueous solutions are not adversely affected by elevated temperatures.

The invention will be illustrated by the following examples and test results.

An industrial sodium nitrite solution containing 28.2% by weight of $NaNO_2$, 13.8% by weight of sodium nitrate ($NaNO_3$), 0.77% by weight of sodium carbonate ($Na_2CO_3$), and 0.30% by weight of sodium bicarbonate ($NaHCO_3$), was diluted with distilled water to prepare solutions containing nitrite concentrations of 500 ppm; 0.5% by weight; 2.5% by weight; 4% by weight and 8% by weight.

A natural *Nitrobacter agilis* sample was prepared from an industrial wastewater treatment plant, which waters contain various bacteria, ammonia, chemical oxidation demand (COD) and other constituents. A common bacteria, nitrosomonas, converts ammonia to nitrite and nitrate, and the *Nitrobacter agilis* converts nitrite to nitrate. In order to starve all the bacteria except the *Nitrobacter agilis*, only $NaNO_2$ was fed to the sludge solution. The solution was aerated continuously and 100 mg/l of the solution of acetic acid was added as a source of carbon. Daily analysis of the aerated solution confirmed the reduction in the nitrite concentration. The solution was doubled with water and additional nitrite added every few days to prepare three liters of a bacteria solution containing a high population of *Nitrobacter agilis*. This solution could convert about 1000 ppm of nitrite to nitrate per day.

A series of test runs were made to test the inhibition of oxidation of nitrite salts to nitrate salts by action of the *Nitrobacter agilis* bacteria.

The test runs were carried out at various concentrations of nitrite by adding the diluted sodium nitrite/sodium nitrate solution to flasks containing the bacteria inoculum.

The nitrite and nitrate content of the solutions were measured by colorimetry. Nitrite ion concentration was measured using Hach's ferrous sulfate method, light absorbance being measured using a spectrophotometer at 585 nm. Nitrate ion concentration was measured using Hach's cadmium reduction method, similarly measuring light absorbance at 500 nm.

A blank aqueous solution containing sodium nitrite/sodium nitrate alone was run concurrently with the bacteria inoculum solutions.

Although the examples describe specific solutions and test parameters, the invention is not meant to be limited to the details described therein.

EXAMPLE 1

This example shows the loss of nitrite ion due to action by the *Nitrobacter agilis* bacteria for dilute solutions of nitrite.

The diluted industrial solutions as prepared above were added to a series of reactors, each containing 200 ml of the *Nitrobacter agilis* solution as prepared above, while monitoring the pH and temperature of the solutions.

An initial biologic (Bio) solution containing 500 ppm of nitrite ion was converted to nitrate ion in less than 100 hours. The results are shown in FIG. 1 line "A" which is a graph of nitrite concentration versus time.

Thus dilute solutions of nitrite ion are attacked by the *Nitrobacter agilis* bacteria which converts the nitrite ions to nitrate ions in a short time.

EXAMPLE 2

The procedure of Example 1 was followed, but a concentration of 5000 ppm of nitrite ion was tested. These results are shown in FIG. 1 line "B". Referring to FIG. 1, it is apparent that the concentration of nitrite also dropped during the first 300 hours of the test, but then stabilized at a level of about 500 ppm. Thus at higher concentrations of nitrite ion, the solution showed some resistance to the action of the *Nitrobacter agilis* bacteria.

EXAMPLE 3

The procedure of Example 1 was repeated at higher nitrite concentrations of 2.5 percent by weight (25,000 ppm). After 28 days, the Bio solution stabilized at about 15,000 ppm of nitrite, as shown by line "C" of FIG. 1.

Thus at high concentrations of about 4% by weight and higher of nitrite ion, the activity of the *Nitrobacter agilis* is effectively inhibited, and the amount of nitrite in solution remains stable over long periods of time.

EXAMPLE 4

A Bio solution initially containing 40,000 ppm (4.0 percent by weight) of sodium nitrite contained 34,820 ppm of nitrite ion after 28 days. A blank solution (sodium nitrite in water) contained 34,377 ppm of nitrite ion.

A Bio solution initially containing 80,000 ppm (8.0 percent by weight) of sodium nitrite contained 73,242 ppm of nitrite ion after 28 days. A blank solution contained 77,163 ppm of nitrite.

The analyses performed above were repeated after 85 days. For the 4 percent nitrite Bio solution, the nitrite concentration was 34,171 ppm and the blank was 33,802 ppm of nitrite ion.

The 8.0 percent by weight sodium nitrite solution contained 71,572 ppm of nitrite ion after 85 days, and the blank contained 73,929 ppm.

Thus nitrite ions continue to be slowly oxidized to nitrate ions, but via a chemical reaction, not a biological one.

EXAMPLE 5

Table I below summarizes the initial and final concentrations of nitrite and nitrate ions in aqueous solution after six months. The Bio solutions contained the *Nitrobacter agilis* solution as prepared above, while the Blank solutions did not. The percentages are by weight.

TABLE I

| Solution | % $NaNO_2$ | % $NaNO_3$ | Ratio $NaNO_2:NaNO_3$ | % Oxidized |
|---|---|---|---|---|
| 4% Bio | 4.43 | 2.55 | 1.74 | 4.7 |
| 4% Blank | 4.46 | 2.31 | 1.93 | 1.5 |
| 8% Bio | 7.78 | 4.22 | 1.84 | 3.0 |
| 8% Blank | 9.42 | 5.01 | 1.88 | 2.3 |

The low degree of oxidation shows that biologic activity for the Bio solutions was quickly inhibited, and suggests that the similar amount of oxidation that occurred in all of the samples, including the blank samples, is chemical in nature, not biologic.

Thus although even at high concentrations of nitrite ion, some oxidation continues to take place, but it is not due to activity of the *Nitrobacter agilis* bacterium, which is completely inhibited at the concentrations required herein. This suggests that small, periodic additions of nitrite ion to the present solutions will maintain the concentration of nitrite at near its initial levels.

EXAMPLE 6

A solution containing about 5% by weight of sodium nitrite and about 2% by weight of sodium nitrate used to store cold was monitored for nitrite and nitrate ion concentration over a period of nine months. The specific gravity of this solution at 60° F. was 1.049 and the pH was about 9.38–9.6. The solution had a viscosity of 1.00 cP and the freezing point of the solution was 3.5° C. below that of water. The results are summarized in Table II below:

TABLE II

| Time | % $NaNO_2$ | % $NaNO_3$ |
|---|---|---|
| Initial | 4.95 | 1.81 |
| After 4 weeks | 5.08 | 1.92 |
| After 9 weeks | 5.07 | 1.85 |
| After 16 weeks | 5.04 | 1.80 |
| After 22 weeks | 5.06 | 1.79 |
| After 25 weeks | 5.04 | 1.78 |

Thus the solution showed no biological activity or reduction in the concentration of nitrite ion over a period of nine months. This study confirms that at a high concentration of nitrite ion, biologic activity of the *Nitrobacter agilis* bacteria is effectively inhibited.

Although even at high concentrations of nitrite ion some oxidation continues to take place, it is not due to activity of the *Nitrobacter agilis* bacterium, which is completely inhibited at the concentrations required herein. This suggests that small, periodic additions of nitrite ion to the present solutions will maintain the concentration of nitrite at near its initial levels.

Although the present invention has been described in terms of specific examples and ion concentrations, it is apparent that various changes can be made to the solutions and their exposure, which are intended to be included herein. For example, nitrite and nitrate salts other than the sodium salts can be substituted herein. The invention is only to be limited by the scope of the appended claims.

We claim:

1. A method of inhibiting the activity of the bacteria *Nitrobacter agilis* in dilute aqueous solutions containing a freezing point depressant additive and nitrite ions as a metal corrosion inhibitor and used in systems in contact with iron-based metal parts which comprises maintaining a concentration of nitrite ion as sodium nitrite of at least 2.5 percent by weight of said solution to inhibit the oxidation of nitrite ions to nitrate ions thereby preventing the loss of an anticorrosive effect of the nitrite ions on the iron-based metal parts.

2. A method according to claim 1 wherein a concentration of nitrite ion of at least about 4 percent by weight is maintained.

3. A method according to claim 1 wherein nitrate ions are also present in said solution.

4. A method according to claim 1 wherein said solution has a pH of at least 8.

5. A method of inhibiting the activity of the bacteria *Nitrobacter agilis* in dilute aqueous bactericide free solutions containing a freezing point depressant additive and sodium nitrite and sodium nitrate salts as a metal corrosion inhibitor and used in systems in contact with iron-based metal parts which comprises maintaining a concentration of the nitrite salt of at least 2.5 percent by weight of said bactericide free solution to inhibit the oxidation of nitrite ions of the nitrite salt to nitrate ions thereby preventing the loss of an anticorrosive effect of nitrite ions on the iron-based metal parts.

* * * * *